US012552520B2

(12) United States Patent
Wilson et al.

(10) Patent No.: US 12,552,520 B2
(45) Date of Patent: Feb. 17, 2026

(54) MOVEABLE WING TIP ACTUATION SYSTEM (71) Applicants: AIRBUS OPERATIONS LIMITED, Bristol (GB); AIRBUS OPERATIONS GmbH, Hamburg (DE)

(72) Inventors: Thomas Wilson, Bristol (GB); Christoph Winkelmann, Hamburg (DE)

(73) Assignees: AIRBUS OPERATIONS LIMITED, Bristol (GB); AIRBUS OPERATIONS GmbH, Hamburg (DE)

(*) Notice: Subject to any disclaimer, the term of this patent is extended or adjusted under 35 U.S.C. 154(b) by 0 days.

(21) Appl. No.: 18/742,416

(22) Filed: Jun. 13, 2024

(65) Prior Publication Data
US 2024/0417060 A1     Dec. 19, 2024

(30) Foreign Application Priority Data
Jun. 16, 2023   (GB) ..................................... 2309070

(51) Int. Cl.
*B64C 23/06*   (2006.01)
*B64C 3/54*    (2006.01)
*B64C 3/56*    (2006.01)

(52) U.S. Cl.
CPC ............ *B64C 23/072* (2017.05); *B64C 3/546* (2013.01); *B64C 3/56* (2013.01)

(58) Field of Classification Search
CPC .......... B64C 3/546; B64C 3/56; B64C 23/072
See application file for complete search history.

(56) References Cited

U.S. PATENT DOCUMENTS

| 5,558,299 A * | 9/1996 | Veile .................... B64C 3/56 244/3.28 |
| 10,293,917 B2 * | 5/2019 | Niemiec ............... B64C 3/56 |

(Continued)

FOREIGN PATENT DOCUMENTS

| CN | 111645849 A | 9/2020 |
| EP | 4071050 A1 | 10/2022 |

(Continued)

OTHER PUBLICATIONS

Combined Search and Examination Report for GB2309070.7, dated Oct. 31, 2023, 8 pages.

(Continued)

*Primary Examiner* — Joseph W Sanderson
(74) *Attorney, Agent, or Firm* — Nixon & Vanderhye, PC (57) ABSTRACT An aircraft wing is disclosed having a fixed wing with a tip, and a wing tip device rotatably mounted on a hinge at the tip of the fixed wing, such that the wing tip device is rotatable about the hinge, and an actuation system for rotating the wing tip device about the hinge. The actuation system includes a motor, at least one geared rotary actuator, a reduction gearbox, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing. The reduction gearbox is positioned between the clutch and the geared rotary actuator along a drive train between the motor and the geared rotary actuator.

15 Claims, 10 Drawing Sheets

(56) References Cited

U.S. PATENT DOCUMENTS

| | | | |
|---|---|---|---|
| 11,098,767 B2* | 8/2021 | Dussart | B64C 13/28 |
| 11,203,410 B2* | 12/2021 | Wilson | B64C 13/16 |
| 11,273,904 B2* | 3/2022 | Dussart | B64C 3/42 |
| 11,319,054 B2* | 5/2022 | Weder | B64C 3/56 |
| 11,358,708 B2* | 6/2022 | O'Rourke | B64C 21/08 |
| 12,037,101 B2* | 7/2024 | Haserodt | B64C 9/14 |
| 12,240,590 B2* | 3/2025 | Winkelmann | F16D 11/10 |
| 2018/0170516 A1* | 6/2018 | Niemiec | B64D 45/0005 |
| 2019/0002083 A1* | 1/2019 | Wilson | B64C 23/072 |
| 2019/0168863 A1* | 6/2019 | Döring | B64C 9/22 |
| 2019/0322355 A1 | 10/2019 | Wilson et al. | |
| 2019/0367154 A1* | 12/2019 | Weder | B64C 3/56 |
| 2020/0130816 A1 | 4/2020 | O'Rourke | |
| 2020/0207461 A1 | 7/2020 | Dussart et al. | |
| 2020/0208687 A1* | 7/2020 | Dussart | B64C 3/56 |
| 2022/0266984 A1 | 8/2022 | Winkelmann | |
| 2022/0324551 A1* | 10/2022 | Haserodt | F16D 47/02 |
| 2024/0253765 A1* | 8/2024 | Habchi | B64C 3/42 |
| 2024/0417059 A1* | 12/2024 | Wilson | B64C 3/56 |
| 2024/0417061 A1* | 12/2024 | Wilson | B64C 13/34 |

FOREIGN PATENT DOCUMENTS

| | | | | |
|---|---|---|---|---|
| GB | 2546246 A | | 7/2017 | |
| GB | 2573105 A | | 10/2019 | |
| GB | 2584668 A | * | 12/2020 | B64C 13/16 |
| WO | 2017118832 A1 | | 7/2017 | |
| WO | WO-2018007010 A1 | * | 1/2018 | B64C 13/28 |
| WO | WO-2024105353 A1 | * | 5/2024 | B64C 13/16 |

OTHER PUBLICATIONS

Further Search Report for GB2309070.7, dated Nov. 28, 2023, 3 pages.

* cited by examiner

MOVEABLE WING TIP ACTUATION SYSTEM

CROSS RELATED APPLICATION

This application claims priority to United Kingdom Patent Application GB 2309070.7, filed Jun. 16, 2023, the entire contents of which is hereby incorporated by reference.

FIELD OF THE INVENTION

The present invention relates to an aircraft wing with a moveable wing tip device.

BACKGROUND OF THE INVENTION

Using a moveable wing tip device during flight is known, e.g. from WO2017118832. This document teaches an aircraft wing having a fixed wing with a wing tip device moveably mounted at the tip thereof, wherein the fixed wing has an upper surface and a lower surface, and the wing tip device has an upper surface and a lower surface, and the wing tip device is operable between: (i) a flight configuration for use during flight, in which configuration the upper and lower surfaces of the wing tip device are continuations of the upper and lower surfaces of the fixed wing; and (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced; wherein the aircraft comprises a restraining assembly operable between a restraining mode in which the wing tip device is held in the flight configuration using a restraining force, and a releasing mode in which the restraining force on the wing tip device is released, such that the wing tip device is able to adopt the load alleviating configuration.

The wing tip device may be entirely passively actuated to the load-alleviating configuration once the restraining assembly is in releasing mode. It may be moved under the action of aerodynamic forces urging the wing tip device towards the load-alleviating configuration. Having the restraining assembly in combination with this hinged wing tip device may be referred to as a "semi-aeroelastic" arrangement.

The wing tip device may be rotatably mounted on a hinge at the tip of the wing, such that it may rotate, about the hinge, between the flight and load alleviating configurations. The wing tip device may also be moveable about the same hinge to a ground configuration for use during ground-based operations, in which ground configuration the wing tip device is moved away from the flight configuration such that the span of the aircraft wing is reduced.

An actuation system may be arranged to move the wing tip device between the flight configuration and the ground configuration. The actuation mechanism may also be arranged to move the wing tip device from the load alleviating configuration back to the flight configuration.

It has been found that when in the load alleviating condition, movement of the wing tip device may need to be tuned. The current invention seeks to address this issue.

SUMMARY OF THE INVENTION

A first aspect of the invention provides an aircraft wing comprising: a fixed wing with a tip; a wing tip device rotatably mounted on a hinge at the tip of the fixed wing such that the wing tip device is rotatable about the hinge; and an actuation system for rotating the wing tip device about the hinge, wherein the actuation system comprises a motor, at least one geared rotary actuator, a reduction gearbox, and a clutch for selectively decoupling rotation of the motor from rotation of the geared rotary actuator. The geared rotary actuator is driveable by the motor, is arranged to convert rotary motion into a different rotary motion and is arranged to rotate the wing tip device relative to the tip of the fixed wing. The reduction gearbox is disposed between the clutch and the geared rotary actuator along a drive train between the motor and the geared rotary actuator.

Disposing the reduction gearbox between the clutch and the geared rotary actuator introduces increased resistance torque (also known as load torque or braking torque) when the clutch is disengaged, as compared to positioning the clutch adjacent the geared rotary actuator. This provides passive damping of the motion of the wing tip device relative to the fixed wing about the hinge. The passive damping may achieve a margin to flutter. The flutter margin is the airspeed margin between the onset of flutter of an aeroelastic part of the aircraft and 115% of the dive speed of the aircraft. The gust response is the reaction of the wing tip device to alleviate loads in response to a wind gust. In this case the reaction is the rate of rotation of the wing tip device about the hinge to decrease lift of the wing tip device. The inventors have surprisingly found that good load alleviation can still be achieved even when the reduction gearbox is disposed between the clutch and the geared rotary actuator, which increases the passive damping of the actuation system so as to increase the flutter margin without passing much bending load across the hinge.

The reduction gearbox may be back driveable when the clutch is disengaged to decouple rotation of the motor from rotation of the geared rotary actuator as the wing tip device rotates about the hinge. Providing a reduction gearbox that is back driveable when the clutch is disengaged ensures the wing tip device can rotate relative to the fixed wing when the clutch is disengaged.

The gearbox may have a maximum damping value which allows oscillating flapping movement of the wing tip device rotating about the hinge during normal operation when the clutch is disengaged. The maximum damping value may be selected to prevent the angular speed of the oscillating flapping movement of the wing tip device about the hinge from exceeding a threshold.

Rotating parts of the clutch when disengaged may have a speed of no more than approximately 30,000 rpm.

The aircraft wing may comprise a plurality of the geared rotary actuators arranged along a hinge line of the hinge. Providing multiple geared rotary actuators instead of a single geared rotary actuator may allow each geared rotary actuator to be made smaller in diameter, reducing the effect of the hinge joint on the aerodynamic performance of the aircraft.

The clutch may have an outer diameter substantially the same as an outer diameter of each of the geared rotary actuators. Providing a clutch with the same outer diameter as an outer diameter of each geared rotary actuator may allow the clutch and geared rotary actuator(s) to be arranged along a common axis of the hinge joint, the hinge joint having a relatively constant outer diameter, reducing the effect of the hinge joint on the aerodynamic performance of the aircraft.

The actuation system may further comprise a brake for preventing motion of the geared rotary actuator when the clutch is engaged. The brake may be used to lock the wing tip device in position relative to the fixed wing, for example during take-off or when stowing the wing tip device on the ground. This may prevent unwanted rotation of the wing tip device about the hinge due to external loads.

The actuation system may be operable in i) a driving mode in which the clutch is engaged and the motor is driven to rotate the wing tip device about the hinge; ii) a flapping mode in which the clutch is disengaged and the wing tip device is rotatable about the hinge by forces external to the wing tip device; and iii) a braked mode in which the clutch is engaged and the brake prevents rotation of the wing tip device about the hinge. The actuation system may be controlled during flight to change between any of the three operation modes such that different modes may be selected dependent on flight conditions and/or requirements.

The braked mode may correspond to a zero or non-zero angular position of the wing tip device about the hinge in which upper and lower surfaces of the wing tip device form a substantially zero or non-zero angle with upper and lower surfaces of the fixed wing. This mode may be used to lock the wing tip device such that the overall span of the fixed wing and wing tip device is at a maximum. This condition may be useful in generating maximum lift for example during take-off.

The actuation system may be further operable in a target mode in which the clutch is engaged, the brake is disengaged, and the motor actively targets a non-zero angular position of the wing tip device about the hinge in which upper and lower surfaces of the wing tip device form a non-zero angle with upper and lower surfaces of the fixed wing. A closed loop control system may be used to feed back the angular position of the wing tip device and control the motor based on this. This system may be used to target a constant zero or non-zero angular position of the wing tip device when the brake is not engaged. For example, operating the wing in the target mode may avoid flutter problems that the wing tip device may otherwise suffer if the brake were applied at those same operating conditions since the motor and drivetrain add damping to the system.

The geared rotary actuator may have a first knuckle fixed to the fixed wing, and a second knuckle fixed to the wing tip device. The first knuckle and the second knuckle may be driven to rotate with respect to each other by the geared rotary actuator using motive force provided by the motor. A system of first and second knuckles may provide a compact system for converting rotary motion from the motor into a different rotary motion of the wing tip about the fixed wing.

The clutch may be configured to be disengaged during flight for a) loads alleviation, or b) when the aircraft is flying at relatively low speed or altitude and a relatively high roll rate is required. Disengaging the clutch may allow the wing tip device to rotate about the hinge joint in response to external forces under these conditions, thus reducing the effect of the loads on bending and/or twisting the wing.

The aircraft wing may further comprise a second reduction gearbox disposed between the clutch and the motor along a drive train between the motor and the geared rotary actuator. This arrangement may allow torque from the motor to be increased in two stages, firstly by the second gearbox ahead of the clutch and secondly by the gearbox positioned between the clutch and the geared rotary actuator. This may allow the reduction ratio of the gearbox to be selected based on the desired damping characteristics of the hinge joint when back-driven, whilst still providing adequate torque to drive the wing tip device. It may also allow the outer diameter of both the gearbox and the second gearbox to be smaller than if a single gearbox was used to provide the same overall gear reduction. The clutch may also be made smaller and lighter as a result of the lower torque through the clutch as compared with a single gearbox hiving the same overall gear reduction disposed between the motor and the clutch.

A further aspect of the invention provides a method of operating an aircraft wing having: a fixed wing with a tip; a wing tip device rotatably mounted on a hinge at the tip of the fixed wing; and an actuation system for rotating the wing tip device about the hinge, wherein the actuation system comprises a motor, at least one geared rotary actuator arranged to convert rotary motion into a different rotary motion, a reduction gearbox, a clutch for selectively decoupling rotation of the motor from rotation of the geared rotary actuator, and a brake for preventing motion of the geared rotary actuator when the clutch is engaged, wherein the reduction gearbox is disposed between the clutch and the geared rotary actuator along a drive train between the motor and the geared rotary actuator, the method comprising operating the actuation system in:

i) a driving mode by engaging the clutch and driving the geared rotary actuator with the motor to rotate the wing tip device about the hinge;

ii) a flapping mode by disengaging the clutch and back driving the gearbox as the wing tip device rotates about the hinge due to forces external to the wing tip device.

A further aspect of the invention provides a method of operating an aircraft wing having: a fixed wing with a tip; a wing tip device rotatably mounted on a hinge at the tip of the fixed wing; and an actuation system for rotating the wing tip device about the hinge, wherein the actuation system comprises a motor, at least one geared rotary actuator arranged to convert rotary motion into a different rotary motion, a clutch for selectively decoupling rotation of the motor from rotation of the geared rotary actuator, and a brake for preventing motion of the geared rotary actuator when the clutch is engaged, the method comprising operating the actuation system in:

1) a driving mode by engaging the clutch and driving the geared rotary actuator with the motor to rotate the wing tip device about the hinge;

2) a flapping mode by disengaging the clutch to allow the wing tip device to rotate about the hinge due to forces external to the wing tip device;

3) a braked mode corresponding to a zero or non-zero angular position of the wing tip device about the hinge in which upper and lower surfaces of the wing tip device form a substantially zero or non-zero angle with upper and lower surfaces of the fixed wing; and 4) a target mode in which the clutch is engaged, the brake is disengaged and the motor actively targets a non-zero angular position of the wing tip device about the hinge in which upper and lower surfaces of the wing tip device form a zero or non-zero angle with upper and lower surfaces of the fixed wing.

Operating the wing in the target mode may avoid flutter problems that the wing tip device may otherwise suffer if the brake mode were used at those same aircraft wing operating conditions since the motor and drivetrain of the actuation system add damping.

A further aspect of the invention provides an aircraft wing comprising a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing, wherein the aircraft wing is operable in:

1) a driving mode by engaging the clutch and driving the geared rotary actuator with the motor to rotate the wing tip device about the hinge;
2) a flapping mode by disengaging the clutch to allow the wing tip device to rotate about the hinge due to forces external to the wing tip device;
3) a braked mode corresponding to a zero or non-zero angular position of the wing tip device about the hinge in which upper and lower surfaces of the wing tip device form a substantially zero or non-zero angle with upper and lower surfaces of the fixed wing; and
4) a target mode in which the clutch is engaged, the brake is disengaged and the motor actively targets a non-zero angular position of the wing tip device about the hinge in which upper and lower surfaces of the wing tip device form a zero or non-zero angle with upper and lower surfaces of the fixed wing.

BRIEF DESCRIPTION OF THE DRAWINGS

Embodiments of the invention will now be described with reference to the accompanying drawings, in which:

FIG. 4c shows a detailed view of a section of the actuation system of FIG. 4a;

FIG. 11c shows an exploded diagram of the actuation system of FIG. 12a.

DETAILED DESCRIPTION OF EMBODIMENT(S)

Figure 1:
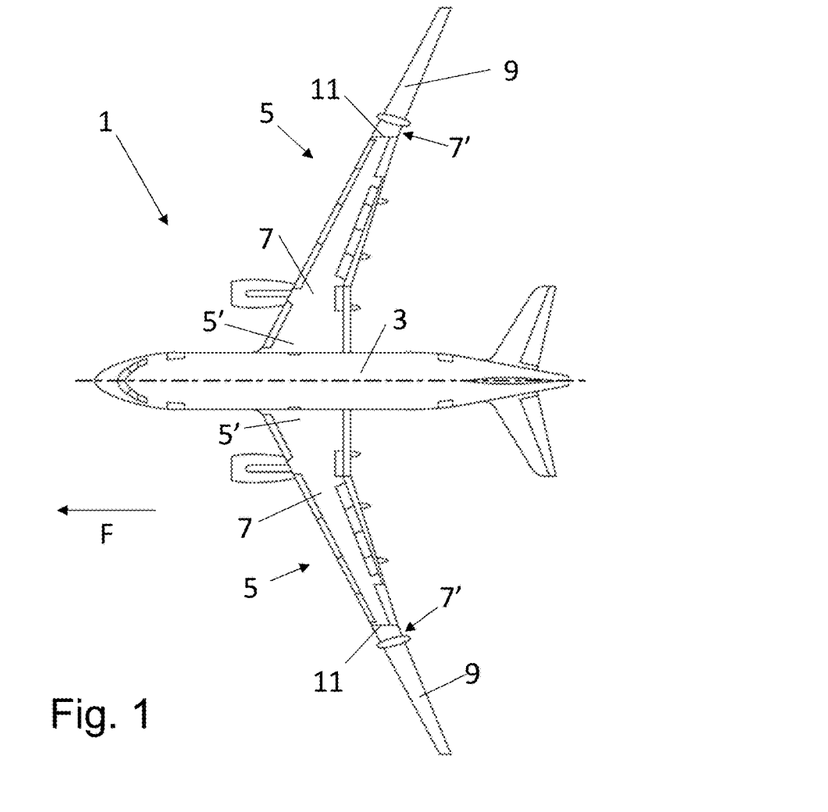
FIG. 1 shows a plan view of an aircraft with a wing and a folding wing tip device.

FIG. 1 is a plan view of an aircraft 1. The aircraft comprises a central fuselage 3 and two main wings 5 extending outwardly from respective wing roots 5'.

Each wing 5 comprises a fixed wing 7 extending from the root 5' to the tip 7'. At the tip 7' of the fixed wing 7, the wing 5 also comprises a moveable wing tip device 9, in the form of a planar wing tip extension. The wing tip device 9 is rotatably mounted about a hinge 11. This hinge 11, may be oriented non-parallel (or 'flared') to the line of flight direction F. The hinge 11 may alternatively be parallel to the line of flight direction F.

In a fixed flight configuration, the wing tip device 9 is fixed with respect to the fixed wing 7. The wing tip device 9 may be an extension of the fixed wing. Accordingly, the upper surface 7a and lower surface 7b of the fixed wing 7 may be continuous with the upper surface 9a and lower surface 9b of the wing tip device 9 (see FIG. 3a and the second from lowermost position in FIG. 2). The leading and trailing edges of the fixed wing 7 may also be continuous with the respective leading and trailing edges of the wing tip device 9. Such an arrangement is beneficial as it provides a relatively large wingspan, thereby providing an aerodynamically efficient aircraft.

However, a large span can result in correspondingly large loads on the wing 5, particularly a large wing root bending moment, especially during high load events such as gusts or extreme maneuvers. This large wing root bending moment for a relatively large span wing is an issue. The wing 5 must be sized to cope with these maximum loads, which can result in a relatively heavy wing, which may be prohibitive.

The ability of the wing tip device 9 to move substantially freely in a moving flight configuration (see FIGS. 2, 3b and 3d) seeks to address that problem. In this configuration, the wing tip device 9 is substantially freely rotatable about the hinge 11 with passive damping as will be described further below.

Figure 2:
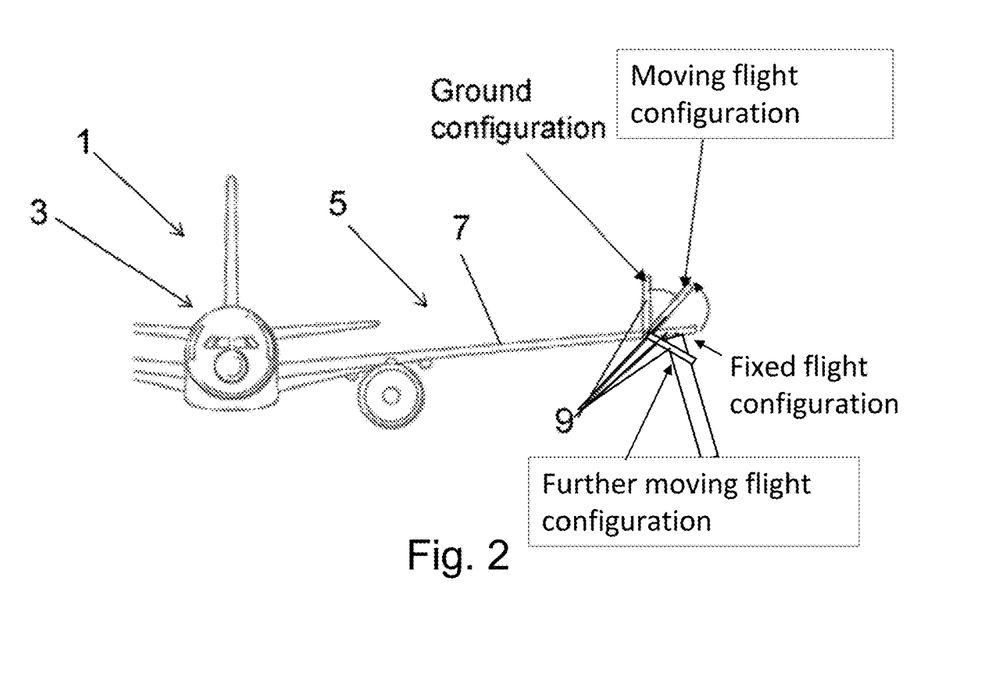
FIG. 2 shows a front view of the aircraft of FIG. 1 with the wing tip device in various configurations.
Figure 3A:
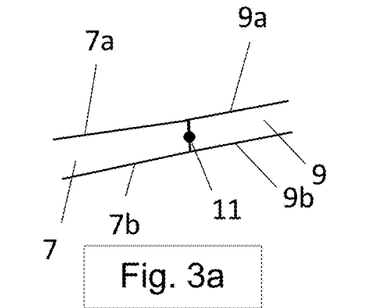
FIGS. 3a, 3b, 3c and 3d show the wing tip device of FIG. 2 in detail.
Figure 3B:
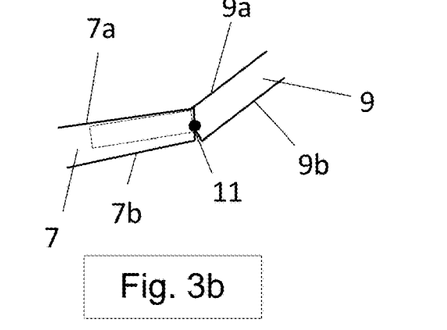

As shown in FIG. 3b and the second from uppermost position in FIG. 2, the wing tip device 9 is rotatable, upwards, such that the lower surfaces between the fixed wing 7 and the wing tip device 9, are no longer continuous with one another. Furthermore, if the hinge 11 is angled with respect to the streamwise direction (i.e. opposite the line of flight direction F), when the wing tip device 9 rotates upwardly its mean incidence is reduced.

Figure 3C:
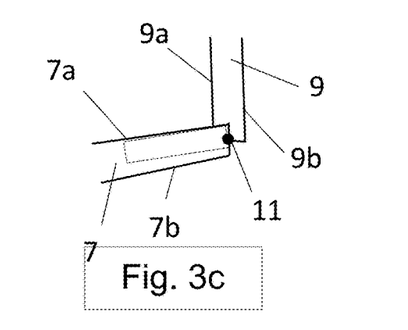
Figure 3D:
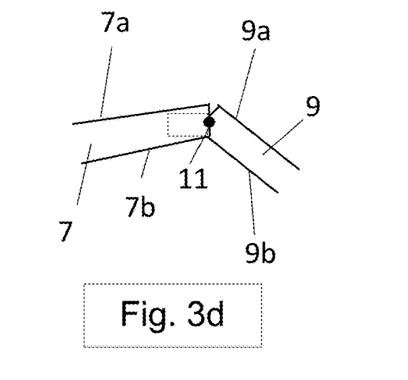

As shown in FIG. 3d and the lowermost position in FIG. 2, the wing tip device 9 is also rotatable downwards, such that the upper faces between the fixed wing 7 and the wing tip device 9 are no longer continuous with one another.

In the moving flight configuration and further moving flight configuration, the loads on the wing 5, generated by the wing tip device 9, are significantly reduced. The wing tip device 9 may be released to either of these configurations during flight (described in more detail below). By providing this load alleviation function during flight, the maximum load the wing needs to be designed for may be reduced, and thus the wing 5 can be made relatively lightweight.

The wing tip device 9 is also configurable to a ground configuration in which the wing tip device 9 is rotated yet further, to a substantially upright position (shown in FIG. 3c and the upright position in FIG. 2). The wing tip device is moveable to this configuration when it is on the ground (described in more detail below). Once rotated to such a position, the span of the aircraft 1 is sufficient to meet airport compatibility gate limits. Thus, the aircraft 1 can have a large span (exceeding gate limits) during flight, but is still able to comply with gate limits when on the ground.

As shown in FIG. 3d, the hinge 11 allows both upward and downward rotation of the wing tip device 9 in the moving flight configuration. Such an arrangement enables both positive-g and negative-g loads to be alleviated.

Figure 4A:
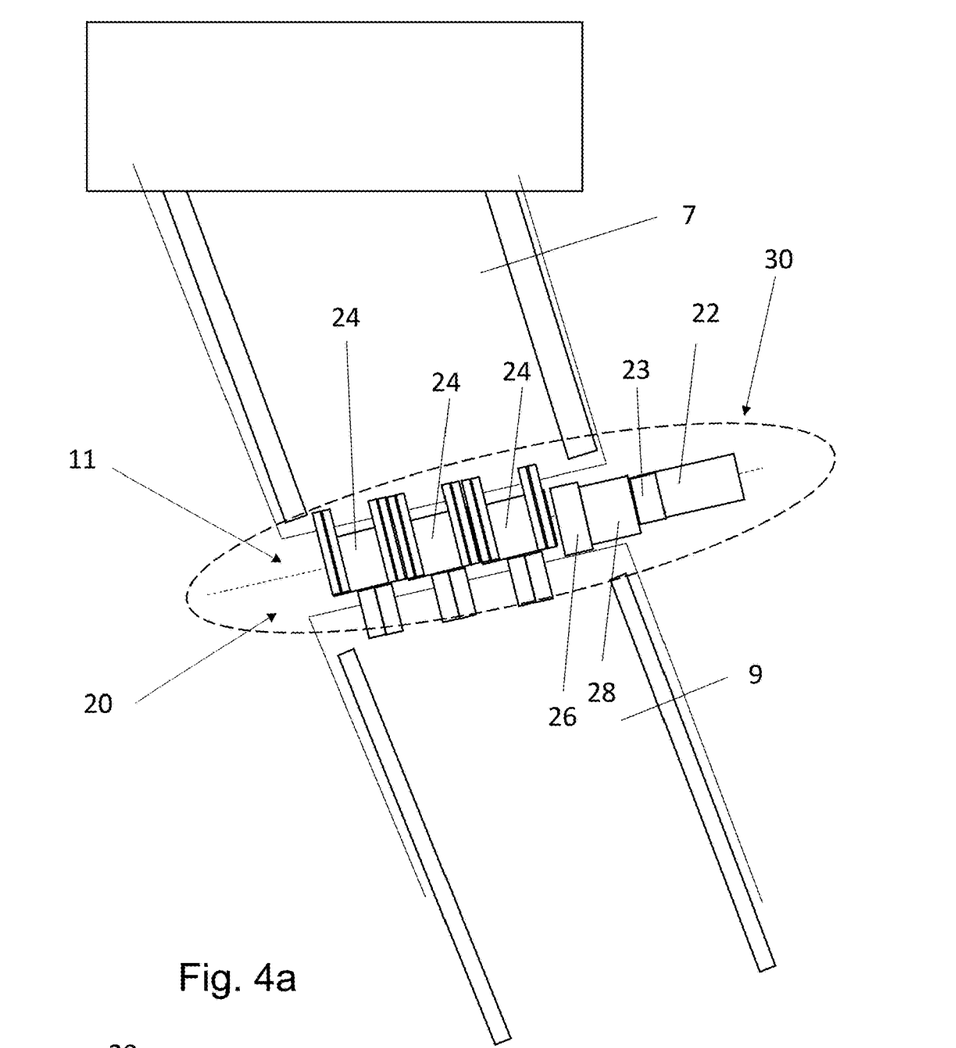
FIG. 4a shows schematically an actuation system for moving the wing tip device in accordance with the invention.
Figure 4B:
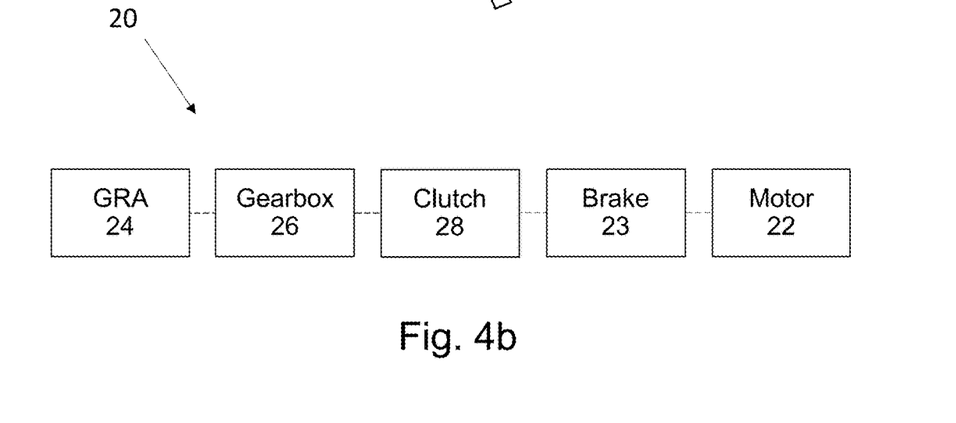
FIG. 4b shows the actuation system of FIG. 4a more generally in block diagram form.

FIGS. 4a and 4b show an example of an actuation system 20 for rotating the wing tip device 9 about the hinge 11. The actuation system 20 comprises a motor 22, at least one geared rotary actuator 24, and a gearbox 26. Where the actuation system 20 comprises a plurality of geared rotary actuators 24, the geared rotary actuators 24 are arranged along the hinge line of the hinge 11. The motor 22 may form part of a power drive unit (PDU) incorporating a brake, or a separate brake 23 may be provided as illustrated in FIGS. 4a and 4b. The geared rotary actuator 24 is a rotary actuator arranged to convert a first rotary motion into a different second rotary motion, e.g. at a different rate of angular rotation and/or torque and/or direction.

Figure 4C:
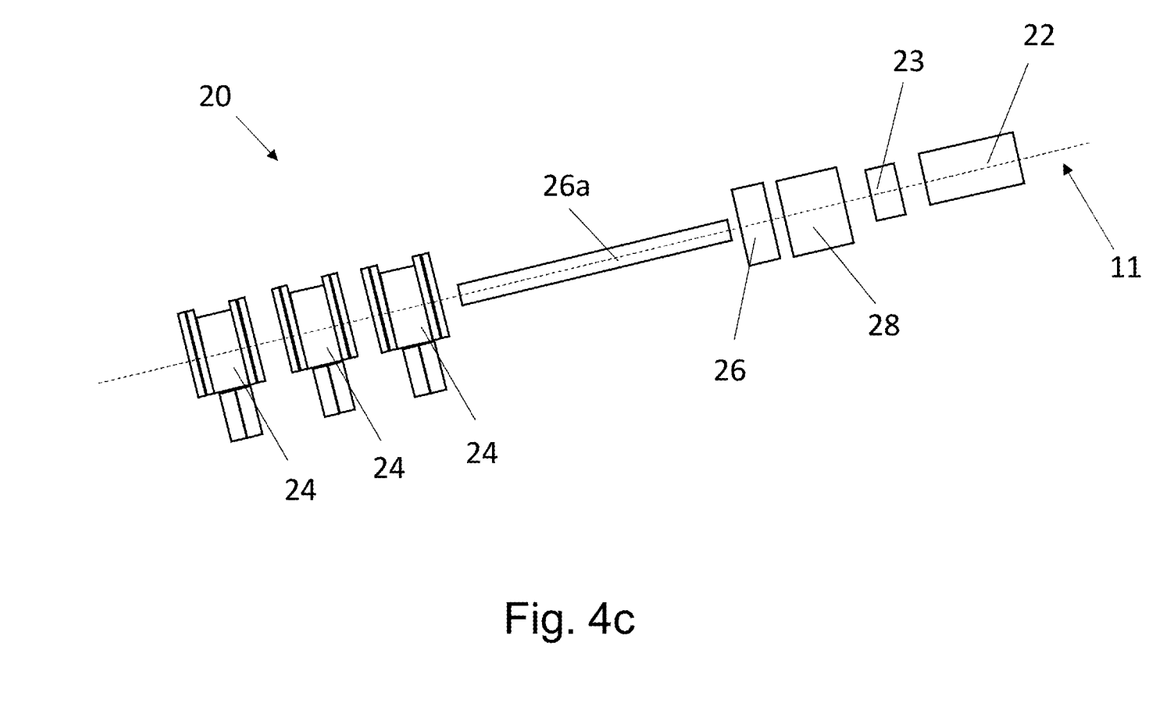

In the illustrated example, there are three geared rotary actuators (GRA) 'slices' 24 arranged along the hinge line of the hinge 11. The three GRAs may be driven off a common shaft 26a coupled via the gearbox 26 as illustrated in FIG. 4c, which is a reduction gearbox. The shaft 26a may have a shaft axis of rotation coaxial with the hinge line of the hinge 11. The motor 22 (or PDU) is arranged at one end of the three GRA slices. The GRAs 24 are each arranged on the hinge line of the hinge 11.

A fairing 30 is shown in FIG. 4a in dashed line which is sized to accommodate the actuation system 20. The clutch 28 may have the same outer diameter as each of the GRAs 24 and optionally the gearbox 26 as illustrated in FIG. 4c such that the frontal surface area of the actuation system 20 and hence fairing 30 is minimized.

Figure 5:
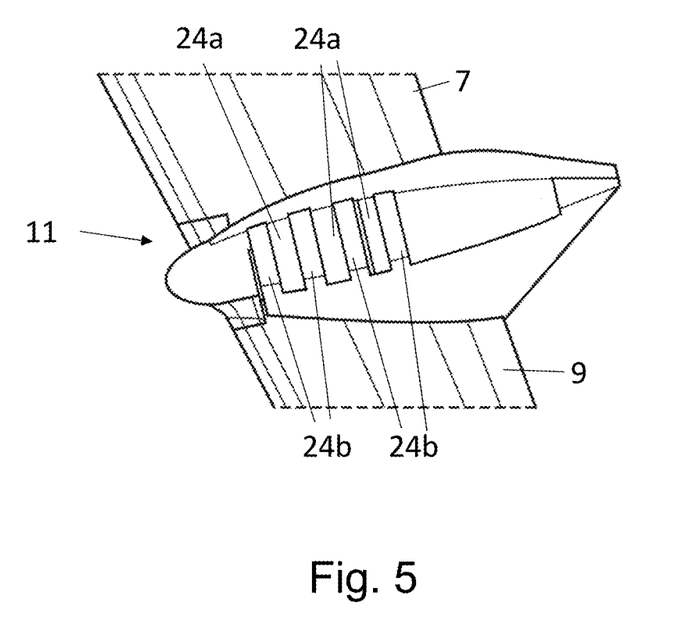
FIG. 5 shows a mechanical actuator according to the invention.

The GRAs 24 each have a first knuckle 24a (or pair of first knuckles) coupled to the fixed wing 7 and a second knuckle 24b (or pair of second knuckles) coupled to the wing tip device 9, such as shown in FIG. 5. Each of the GRAs 24 is substantially identical and comprises an internal gearing to apply a gear ratio to torque applied to the GRA via the common shaft 26a. When the motor 22 is activated to drive the common drive shaft 26a via the gearbox 26, the second knuckles 24b rotate relative to the first knuckles 24a of the GRAs 24. This drives the articulation of the wing tip device 9 relative to the fixed wing 7 about the hinge 11. The rotation may be a positive or negative rotation.

Figures 6A, 6B:
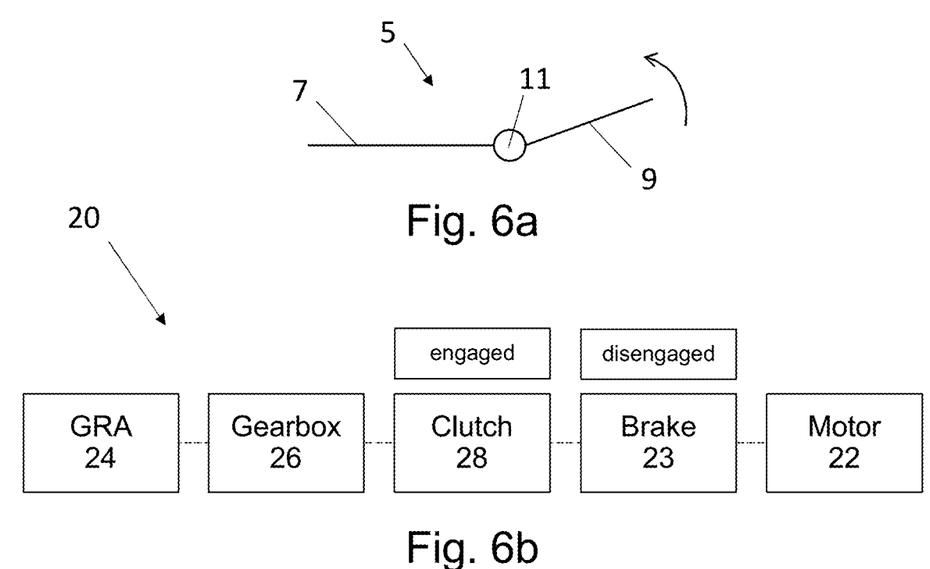
FIG. 6a shows schematically a wing tip device operating in a driving mode of operation.
FIG. 6b shows a representation of an actuation system configured to operate in a driving mode.

A clutch 28 is provided between the gearbox 26 and the motor 22. In this way the clutch 28 may be designed to handle lower torque as it is arranged before a gear ratio is applied to the torque from the motor 22 by the gearbox 26. This may reduce the size, weight, cost and complexity of the clutch 28. Engaging the clutch 28 enables the motor 22 to drive the GRAs 24 in a driving mode to rotate the wing tip device 9 about the hinge 11. An example of the schematic representation of the actuation system 20 operating in a driving mode is illustrated by FIG. 6a, the curved arrow indicating the direction (e.g. anticlockwise when looking aft) in which the motor 22 rotates the wing tip device 9. It is noted that the motor 22 may alternatively rotate the wing tip device 9 in an opposite (e.g. clockwise) direction about the hinge 11. FIG. 6b illustrates how the clutch 28 and brake 23 are configured to allow the motor 22 to drive the wing tip device 9.

Figures 7A, 7B:
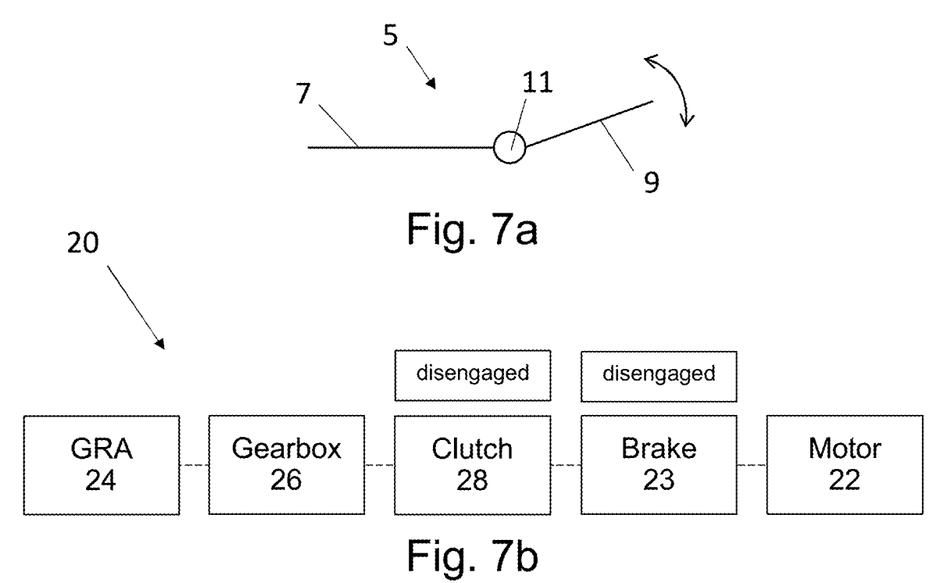
FIG. 7a shows schematically a wing tip device operating in a flapping mode of operation.
FIG. 7b shows a representation of an actuation system configured to operate in a fapping mode.

Disengaging the clutch 28 enables the GRAs 24 to substantially freely rotate, thereby allowing substantially free rotation (with passive damping due to the actuation system) of the wing tip device 9 relative to the fixed wing 7 about the hinge 11 when in a flapping mode of operation. The wing tip device 9 may be entirely passively actuated in the flapping mode once the brake 23 and clutch 28 are released. For example, the wing tip device may be moved under the action of aerodynamic forces and/or gravity. The option to brake or release the wing tip device may be referred to as a "semi-aeroelastic" arrangement. A schematic representation of the actuation system 20 operating in a flapping mode is illustrated by FIG. 7a, the curved arrow indicating allowable rotation of the wing tip device 9. FIG. 7b illustrates how the clutch 28 and brake 23 are configured to allow the wing tip device 9 to freely rotate about the hinge 11.

When the clutch 28 is disengaged, the gearbox 26 may be back driveable such that the gearbox 26 is operable by movement of the wing tip device 9 rotating about the hinge 11. This may introduce mechanical damping into the system, optionally wherein the gearbox 26 has a maximum damping value which allows oscillating flapping movement of the wing tip device 9 rotating about the hinge 11 when operating in the flapping mode. The maximum damping value of the gearbox 26 may be approximately 500 Nm/rad/s. Once disengaged, rotating parts of the clutch 28 may be limited to have a speed of no more than approximately 30,000 rpm, preferably less than 25,000 rpm.

Operating the actuation system 20 in the flapping mode requires due consideration of flutter modes. Flying at certain aircraft speeds, such as the flutter speed of the wing 5, could cause flutter instability which may damage the wing 5. By introducing passive damping to the actuation system 20 using the gearbox 26 as described above. the flutter margin of the fixed wing/wing tip device is increased.

This passive damping of the motion of the wing tip device relative to the fixed wing about the hinge may increase the flutter margin of the fixed wing/wing tip device and reduce the gust response of the wing tip device when the wing tip device is released due to the disengagement of the clutch. Good load alleviation can still be achieved when the reduction gearbox is disposed between the clutch and the geared rotary actuator, which increases the flutter margin to avoid potential flutter problems. The passive damping may have the effect of increasing flutter stability when the wing tip device is release in the flapping mode, and also decreases the flapping frequency in the flapping mode. This may have a beneficial effect on several types of flutter associated with the hinge. For example, i) the coupling of the flapping mode and the first wing bending mode, and ii) the higher frequency coupling of the flapping mode (or outer wing bending mode if the wing tip device is braked) and the outer wing torsion/fore-aft mode, which is sensitive to the angle between the fixed wing 7 and the wing tip device 9. The passive damping therefore may allow an increase in the flare angle of the hinge line without compromising the mitigation of the type i) flutter, which in turn may reduce the coasting angle (the static equilibrium angle between the fixed wing 7 and the wing tip device 9 when the wing tip device 9 operates in the flapping mode). Reducing the coasting angle of the wing tip device 9 may increase the stability of the type ii) flutter. Increasing the flutter margin of the folding wing tip device 9 by adding damping to the hinge 11 may also impact on flutter response of other aircraft movables such as aircraft ailerons. The increased damping about the hinge may also reduce the amplitude of the flapping oscillation of the wing tip device when release at lower aircraft speeds, which may avoid the need for (or reduce the size and hence weight of) a stop to prevent over rotation of the folding wing tip device (e.g. stops at around plus or minus 90 degrees).

Alternatively, the clutch 28 may be configured to be disengaged during flight. In other words, the wing tip device 9 may operate in a flapping mode at aircraft speeds where flutter instability does not occur.

The clutch 28 may be disengaged during flight for a number of reasons. Allowing the wing tip device 9 to rotate substantially freely may be used to alleviate loads acting on the wing 5 as a result of external forces. As such, the maximum load the wing 5 needs to be designed for may be reduced, and thus the wing 5 can be made relatively lightweight. Alternatively, the wing tip device 9 may be allowed to freely rotate such that span of the wing 5 is effectively reduced. Reducing the span of the wing 5 may be beneficial for example during relatively low speed or altitude flying where high levels of lift are not required, or when a relatively high roll rate is required.

Figure 8A:
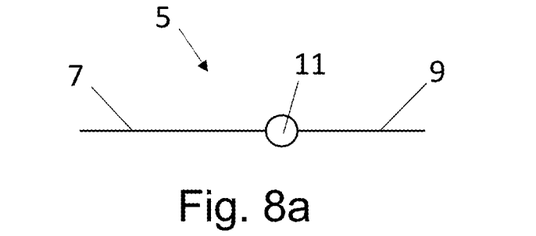
FIG. 8a shows schematically a wing tip device operating in a braked mode of operation.
Figure 8B:
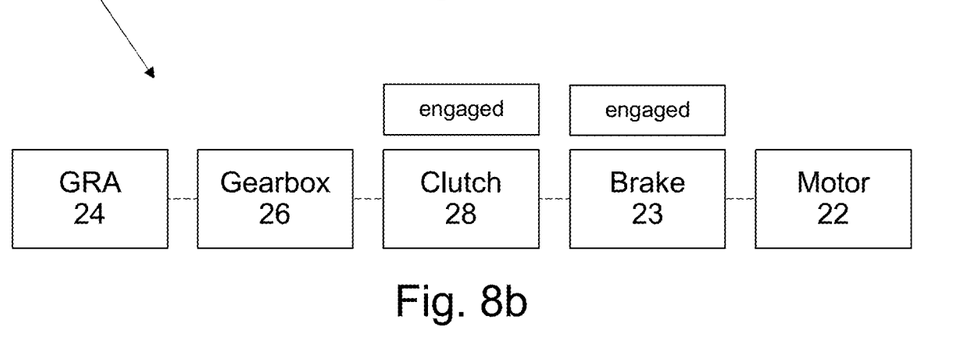
FIG. 8b shows a representation of an actuation system configured to operate in a braked mode.

When the brake 23 (optionally of the PDU) is engaged and the clutch 28 is also engaged, the actuation system 20 operates in a braked mode in which the brake 23 acts to prevent rotation of the wing tip device 9 relative to the fixed wing 7 about the hinge 11. The braked mode of operation may correspond to a zero or non-zero angular position of the wing tip device 9 about the hinge 11. In this zero position the upper surface 9a and lower surface 9b of the wing tip device 9 form a substantially zero angle with the upper surface 7a and lower surface 7b of the fixed wing 7 such that the overall span of the wing 5 is at a maximum, or alternatively in the non-zero position the upper surface 9a and lower surface 9b of the wing tip device 9 form a non-zero angle with the upper surface 7a and lower surface 7b of the fixed wing 7. A schematic representation of the actuation system 20 operating in a braked mode is illustrated by FIG. 8a. FIG. 8b illustrates how the clutch and brake are configured to prevent the wing tip device 9 rotating about the hinge 11.

Figure 9A:
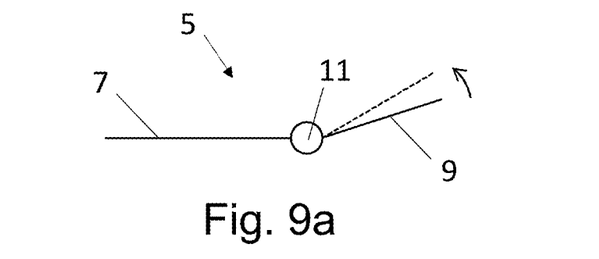
FIG. 9a shows schematically a wing tip device operating in a target mode of operation.
Figure 9B:
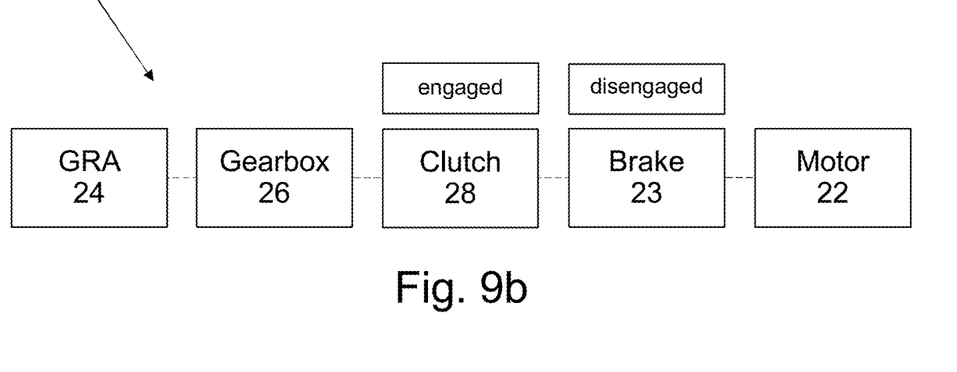
FIG. 9b shows a representation of an actuation system configured to operate in a target mode.

The actuation system 20 may further be operable in a target mode in which the clutch 28 is engaged and the brake 23 is disengaged such that the motor 22 may drive rotation of the wing tip device 9 about the hinge 11. The motor 22 may be configured to actively target a zero or non-zero angular position of the wing tip device 9 relative to the fixed wing 7, such that the upper surface 9a and lower surface 9b of the wing tip device 9 form a zero or non-zero angle with the upper surface 7a and lower surface 7b of the fixed wing 7. Angular position of the wing tip device 9 may be fed back to the motor 22 using a closed loop control system such that the motor 22 is driven to alter the angular position of the wing tip device 9 to match the target position. This 'target' operation mode may be useful for example when the braked mode to achieve the same angular position of the wing tip device may otherwise suffer flutter problems at the same aircraft operating conditions, or where the clutch is in a fail-safe mode. A schematic representation of the actuation system 20 operating in a target mode is illustrated by FIG. 9a, the dashed line indicating a non-zero target position of the wing tip device 9, and the curved arrow indicating the direction in which the motor 22 is driving the wing tip device 9 to achieve the target position. FIG. 9b illustrates how the clutch and brake are configured to allow the motor 22 to drive the wing tip device 9.

The actuation system 20 may be operable in any combination of the above-described operation modes and may change between modes of operation during flight.

Figure 10A:
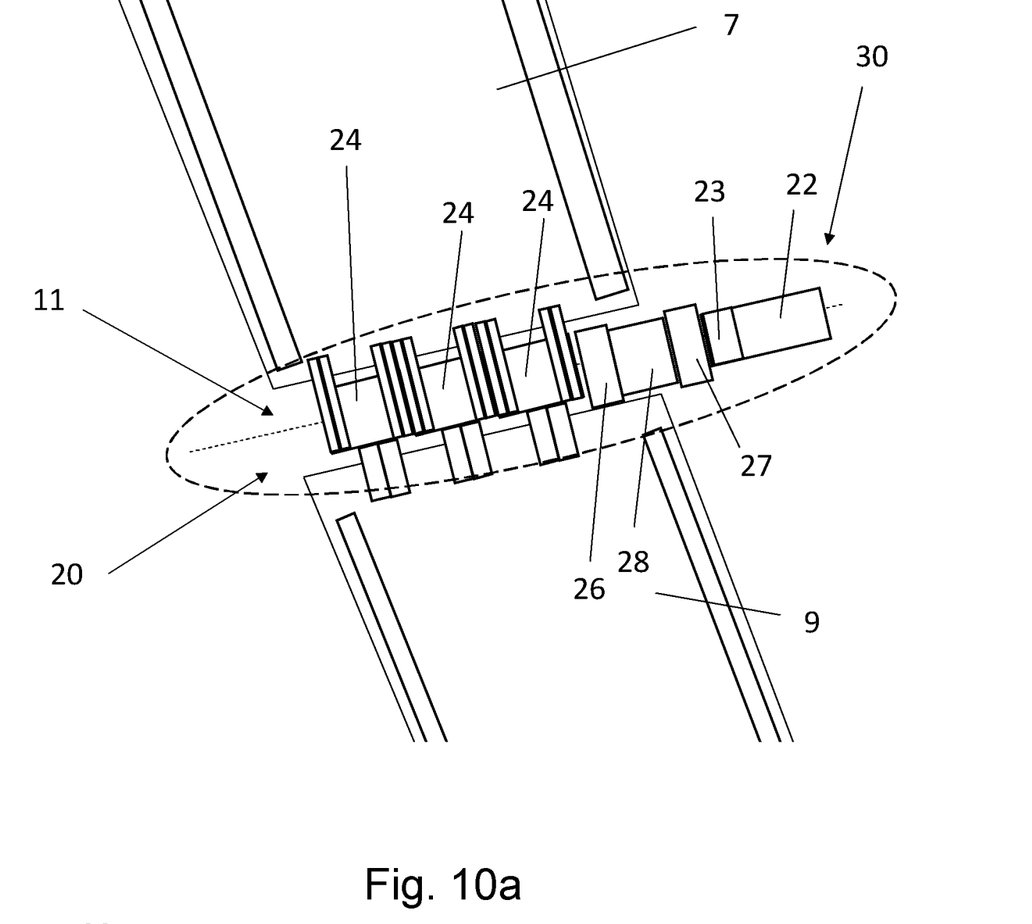
FIG. 10a shows schematically a further actuation system for moving the wing tip device in accordance with the invention.
Figure 10B:
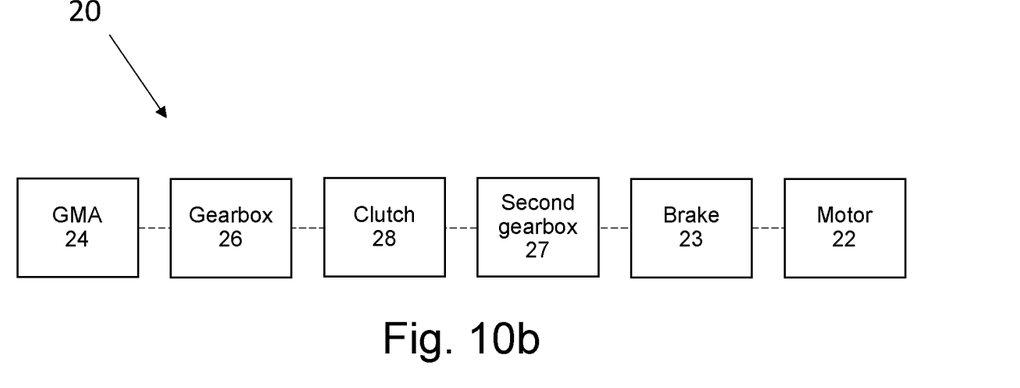
FIG. 10b shows the actuation system of FIG. 11a more generally in block diagram form.

FIG. 10a shows a further embodiment (combinable with any of the previous disclosure) wherein the actuation system 20 comprises a second gearbox 27, the second gearbox 27 arranged between the clutch 28 and the motor 22. Providing a gearbox 26 and a second gearbox 27 allows torque from the motor 22 to be increased in two stages, first by the second gearbox 27 before it is transferred through the clutch 28 to be again increased by the gearbox 26. As such the gear ratio and hence size of each of the gearbox 26 and second gearbox 27 may be made smaller than were a single gearbox 26 used as shown in FIGS. 4a and 4b. This may be beneficial in reducing the overall size of the actuation system 20 and hence the size of any fairing 30 arranged thereabout. Further, this may allow the reduction ratio of the gearbox 26 to be selected based on the desired damping characteristics of the hinge joint when back-driven, whilst still providing adequate torque to drive the wing tip device 9 using the second gearbox 27. FIG. 10b shows this arrangement more generally in a block diagram.

Figure 11A:
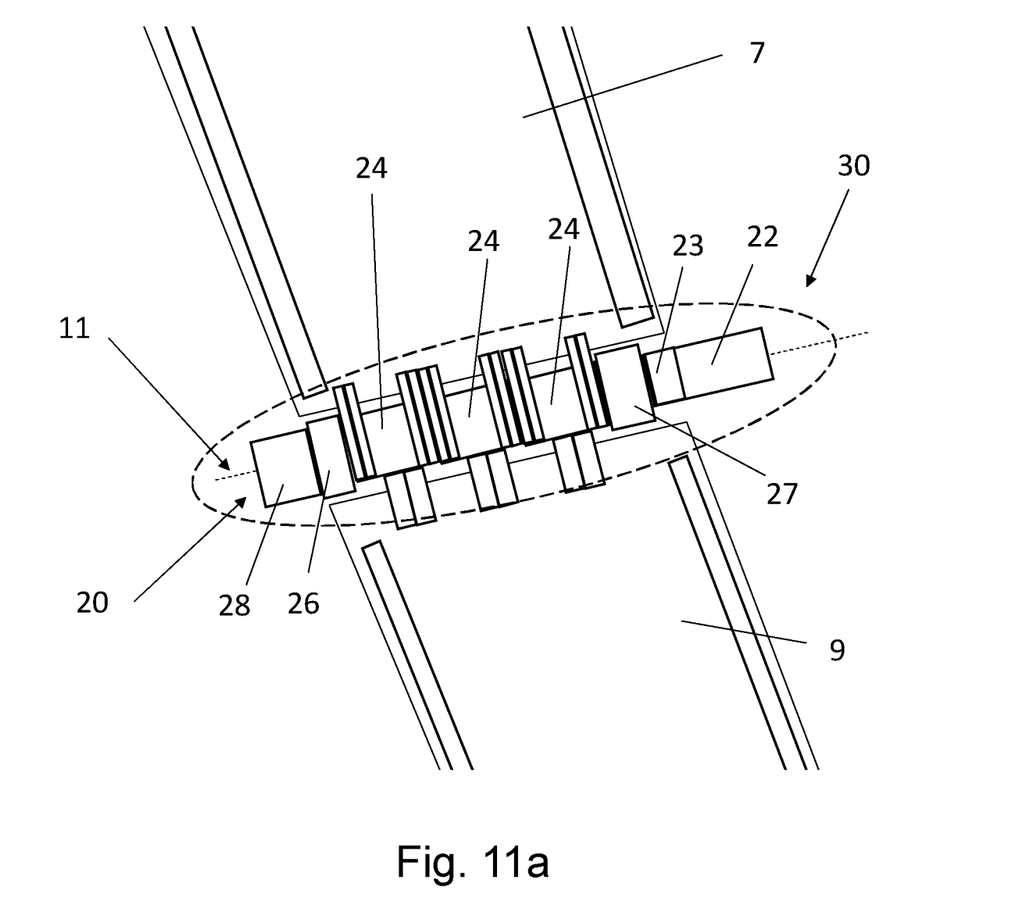
FIG. 11a shows schematically another further actuation system for moving the wing tip device in accordance with the invention.
Figure 11B:
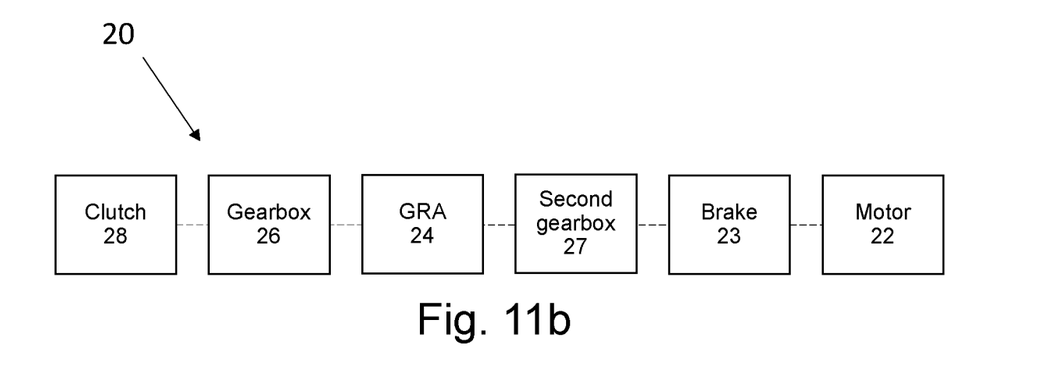
FIG. 11b shows the actuation system of FIG. 12a more generally in block diagram form.
Figure 11C:
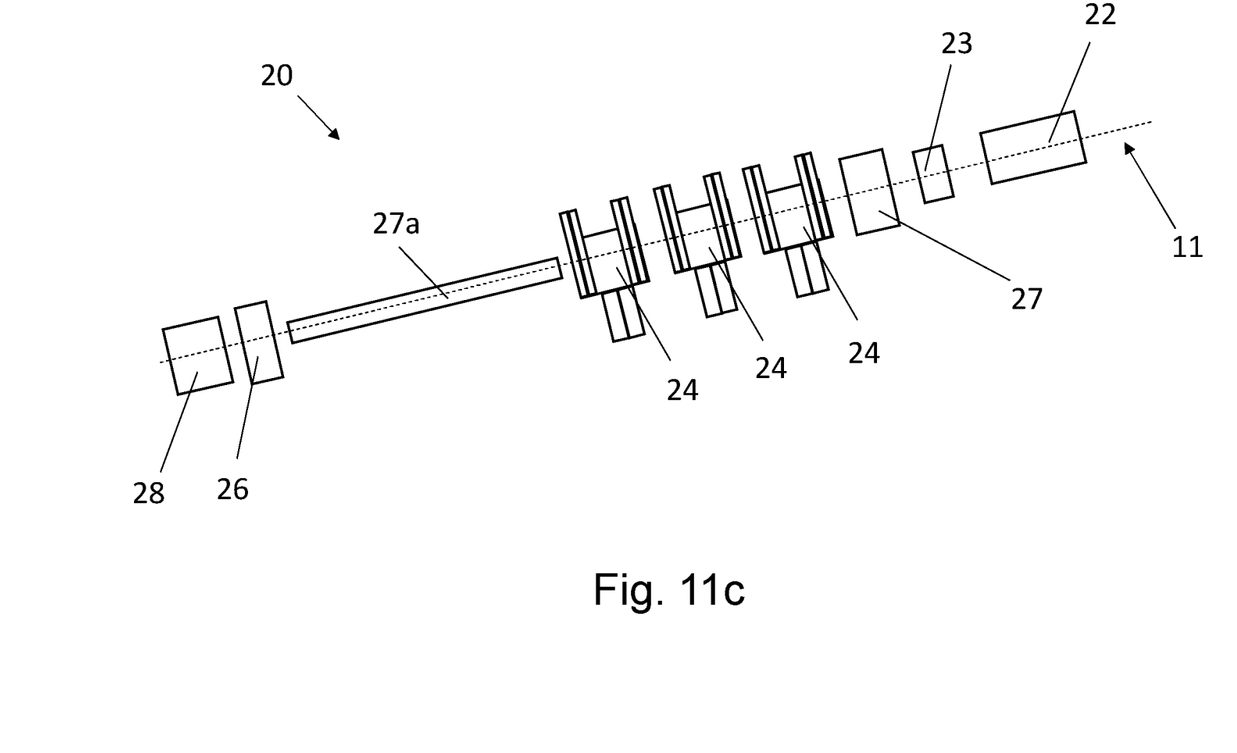

The actuation system 20 may alternatively be configured as illustrated in FIGS. 11a and 11b, with the motor 22 arranged on the opposite side of the geared rotary actuators 24 to the clutch 28 and gearbox 26. This arrangement may position the clutch 28 and gearbox 26 ahead of the leading edge of the wing 5 as shown in FIG. 11a, which may be beneficial for example for packaging components within the fairing 30. Although shown to include a second gearbox 27, this configuration may also be applied to actuation mechanisms comprising a single gearbox 26 only. An example of an actuation system 20 configured as such is shown in exploded view in FIG. 11c. In this example, a drive shaft 27a connected to the second gearbox 27 transfers a torque to the clutch 28 but does not act on the geared rotary actuators 24. Once engaged, the clutch 28 transfers torque to the gearbox 26 which in turn drives the geared rotary actuators 24, for example using a common shaft 26a as illustrated in FIG. 4c.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing, comprising:
a fixed wing with a tip, and a wing tip device rotatably mounted on a hinge at the tip of the fixed wing, such that the wing tip device is rotatable about the hinge, and an actuation system for rotating the wing tip device about the hinge,
wherein the actuation system comprises a motor, at least one geared rotary actuator, a reduction gearbox, a clutch for selectively decoupling rotation of the motor from rotation of the at least one geared rotary actuator, the geared rotary actuator is driveable by the motor and arranged to convert rotary motion into a different rotary motion and is arranged to rotate the wing tip device relative to the tip of the fixed wing,
wherein the reduction gearbox is disposed between the clutch and the geared rotary actuator along a drive train between the motor and the geared rotary actuator, wherein the reduction gearbox, the clutch, and the at least one geared rotary actuator are co-linear, and wherein the reduction gearbox is back driveable when the clutch is disengaged to decouple rotation of the motor from rotation of the at least one geared rotary actuator as the wing tip device rotates about the hinge.

2. An aircraft wing according to claim 1, wherein the gearbox has a maximum damping value which allows oscillating flapping movement of the wing tip device rotating about the hinge during normal operation when the clutch is disengaged.

3. An aircraft wing according to claim 1, wherein rotating parts of the clutch when disengaged have a speed of no more than approximately 30,000 rpm.

4. An aircraft wing according to claim 1, wherein the at least one geared rotary actuator is a plurality of the geared rotary actuators arranged along a hinge line of the hinge.

5. An aircraft wing according to claim 4, wherein the clutch has an outer diameter substantially the same as an outer diameter of each of the geared rotary actuators.

6. An aircraft wing according to claim 1, wherein the actuation system further comprises a brake for preventing motion of the at least one geared rotary actuator when the clutch is engaged.

7. An aircraft wing according to claim 6, wherein the actuation system is operable in i) a driving mode in which the clutch is engaged and the motor is driven to rotate the wing tip device about the hinge; ii) a flapping mode in which the clutch is disengaged and the wing tip device is rotatable about the hinge by forces external to the wing tip device; and iii) a braked mode in which the clutch is engaged and the brake prevents rotation of the wing tip device about the hinge.

8. An aircraft wing according to claim 7, wherein the braked mode corresponds to a zero angular position of the wing tip device about the hinge in which upper and lower surfaces of the wing tip device form a substantially zero angle with upper and lower surfaces of the fixed wing, or wherein the braked mode corresponds to a non-zero angular position of the wing tip device about the hinge in which upper and lower surfaces of the wing tip device form a substantially non-zero angle with upper and lower surfaces of the fixed wing.

9. An aircraft wing according to claim 7, wherein the actuation system is further operable in a target mode in which the clutch is engaged, the brake is disengaged and the motor actively targets a non-zero angular position of the wing tip device about the hinge in which upper and lower surfaces of the wing tip device form a non-zero angle with upper and lower surfaces of the fixed wing.

10. An aircraft wing according to claim 1, wherein the at least one geared rotary actuator has a first knuckle fixed to the fixed wing, and a second knuckle fixed to the wing tip device, wherein the first knuckle and the second knuckle are driven to rotate with respect to each other by the at least one geared rotary actuator using motive force provided by the motor.

11. An aircraft wing according to claim 1, wherein the clutch is configured to be disengaged during flight for a) load alleviation, or b) when the aircraft is flying at relatively low speed or low altitude and a relatively high roll rate is required.

12. An aircraft wing according to claim 1, further comprising a second reduction gearbox disposed between the clutch and the motor along the drive train between the motor and the at least one geared rotary actuator.

13. A method of operating an aircraft wing having a fixed wing with a tip, a wing tip device rotatably mounted on a hinge at the tip of the fixed wing, and an actuation system for rotating the wing tip device about the hinge, wherein the actuation system comprises a motor, at least one geared rotary actuator arranged to convert rotary motion into a different rotary motion, a reduction gearbox, a clutch for selectively decoupling rotation of the motor from rotation of the at least one geared rotary actuator, and a brake for preventing motion of the at least one geared rotary actuator when the clutch is engaged, wherein the reduction gearbox is disposed between the clutch and the at least one geared rotary actuator along a drive train between the motor and the at least one geared rotary actuator, wherein the reduction gearbox, the clutch, and the at least one geared rotary actuator are co-linear, and the method comprising operating the actuation system in:
  i) a driving mode by engaging the clutch and driving the at least one geared rotary actuator with the motor to rotate the wing tip device about the hinge;
  ii) a flapping mode by disengaging the clutch and back driving the gearbox as the wing tip device rotates about the hinge due to forces external to the wing tip device.

14. A method of operating an aircraft wing having a fixed wing with a tip, a wing tip device rotatably mounted on a hinge at the tip of the fixed wing, and an actuation system for rotating the wing tip device about the hinge, wherein the actuation system comprises a motor, at least one geared rotary actuator arranged to convert rotary motion into a different rotary motion, a clutch for selectively decoupling rotation of the motor from rotation of the at least one geared rotary actuator, and a brake for preventing motion of the at least one geared rotary actuator when the clutch is engaged, wherein the reduction gearbox, the clutch, and the at least one geared rotary actuator are co-linear, and the method comprising operating the actuation system in:
  a driving mode by engaging the clutch and driving the at least one geared rotary actuator with the motor to rotate the wing tip device about the hinge;
  a flapping mode by disengaging the clutch to allow the wing tip device to rotate about the hinge due to forces external to the wing tip device;
  a braked mode corresponding to an angular position of the wing tip device about the hinge in which upper and lower surfaces of the wing tip device form an angle with upper and lower surfaces of the fixed wing; and
  a target mode in which the clutch is engaged, the brake is disengaged and the motor actively targets an angular position of the wing tip device about the hinge in which upper and lower surfaces of the wing tip device form an angle with upper and lower surfaces of the fixed wing.

15. An aircraft wing comprises a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a clutch for selectively decoupling rotation of the motor from rotation of the at least one geared rotary actuator, the at least one geared rotary actuator is driveable by the motor and arranged to convert rotary motion into a different rotary motion and is arranged to rotate the wing tip device relative to the tip of the fixed wing, wherein the reduction gearbox, the clutch, and the at least one geared rotary actuator are co-linear, and wherein the aircraft wing is operable in:
- a driving mode by engaging the clutch and driving the at least one geared rotary actuator with the motor to rotate the wing tip device about the hinge;
- a flapping mode by disengaging the clutch to allow the wing tip device to rotate about the hinge due to forces external to the wing tip device;
- a braked mode corresponding to an angular position of the wing tip device about the hinge in which upper and lower surfaces of the wing tip device form an angle with upper and lower surfaces of the fixed wing; and
- a target mode in which the clutch is engaged, the brake is disengaged and the motor actively targets an angular position of the wing tip device about the hinge in which upper and lower surfaces of the wing tip device form an angle with upper and lower surfaces of the fixed wing.

* * * * *